US008910134B2

(12) United States Patent
Hong et al.

(10) Patent No.: US 8,910,134 B2
(45) Date of Patent: Dec. 9, 2014

(54) SYSTEM FOR APPLYING TRANSFORMATION TO IMPROVE GRAPH ANALYSIS (71) Applicant: Oracle International Corporation, Redwood Shores, CA (US)

(72) Inventors: Sungpack Hong, Palo Alto, CA (US); Hassan Chafi, San Mateo, CA (US); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

(21) Appl. No.: 13/733,424

(22) Filed: Jan. 3, 2013

(65) Prior Publication Data
US 2014/0189665 A1  Jul. 3, 2014

(51) Int. Cl.
*G06F 9/45* (2006.01)

(52) U.S. Cl.
CPC ..................... *G06F 8/443* (2013.01)
USPC ........... 717/151; 717/154; 717/155; 717/156; 717/157

(58) Field of Classification Search
None
See application file for complete search history.

(56) References Cited

U.S. PATENT DOCUMENTS

| 5,249,295 | A | * | 9/1993 | Briggs et al. | 717/157 |
|---|---|---|---|---|---|
| 5,339,238 | A | * | 8/1994 | Benson | 717/159 |
| 5,418,958 | A | * | 5/1995 | Goebel | 717/156 |
| 5,598,560 | A | * | 1/1997 | Benson | 717/159 |
| 5,659,754 | A | * | 8/1997 | Grove et al. | 717/158 |
| 7,900,193 | B1 | * | 3/2011 | Kolawa et al. | 717/126 |
| 8,359,583 | B2 | * | 1/2013 | Chou et al. | 717/132 |
| 8,473,928 | B2 | * | 6/2013 | Park et al. | 717/133 |
| 2001/0049682 | A1 | * | 12/2001 | Vincent et al. | 707/100 |
| 2002/0095668 | A1 | * | 7/2002 | Koseki et al. | 717/157 |
| 2004/0225996 | A1 | * | 11/2004 | Venkatesan et al. | 717/100 |
| 2005/0039175 | A1 | * | 2/2005 | Tatge et al. | 717/156 |
| 2008/0028380 | A1 | * | 1/2008 | Guo et al. | 717/151 |
| 2008/0134138 | A1 | * | 6/2008 | Chamieh et al. | 717/105 |
| 2009/0235237 | A1 | * | 9/2009 | Song et al. | 717/132 |
| 2010/0050156 | A1 | * | 2/2010 | Bonanno et al. | 717/122 |
| 2012/0254845 | A1 | * | 10/2012 | Yi et al. | 717/144 |
| 2013/0291113 | A1 | * | 10/2013 | Dewey | 726/25 |

OTHER PUBLICATIONS

Chung et al., "Edge flipping in graphs," Department of Mathematics, University of California, San Diego, Jun. 22, 2011.*
Cao et al., "GOP: A Graph-Oriented Programming Model for Parallel and Distributed Systems," New Horizons of Parallel and Distributed Computing 2005, pp. 21-36.*

(Continued)

*Primary Examiner* — Insun Kang
(74) *Attorney, Agent, or Firm* — Hickman Palermo Truong Becker Bingham Wong LLP (57) ABSTRACT A method for performing a neighbor-flipping transformation is provided. In one embodiment, a graph analysis program for computing a function relating to nodes in a directed graph is obtained and analyzed for neighborhood iterating operations, in which a function is computed over sets of nodes in the graph. For any detected neighborhood iterating operation, the method transforms the iterating operation by reversing the neighbor node relationship between the nodes in the operation. The transformed operation computes the same value for the function as the operation prior to transformation. The method alters the neighbor node relationship automatically, so that a user does not have to recode the graph analysis program. In some cases, the method includes construction of edges in the reverse direction while retaining the original edges in addition to performing the transformation.

15 Claims, 6 Drawing Sheets

(56) References Cited

OTHER PUBLICATIONS

Chan et al., "Visual programming support for graph-oriented parallel/distributed processing," Softw. Pract. Exper. 2005; 35:1409-1439; Published online Jul. 29, 2005 in Wiley InterScience.*
Green-Marl, Standford engineering, copyright 2011.*
Hong et al., "Green-Marl: A DSL for Easy and Efficient Graph Analysis," Copyrightc 2012 ACM.*
Madduri et al., "A faster parallel algorithm and efficient multithread implementations for evaluating betweenness centrality on massive datasets," in Proc. $3^{rd}$Workshop on Multithread Architectures and Applications (MTAAP) IEEE Computer Society, May 29, 2009, 8 pgs.
Malewicz et al., "Pregel: A System for Large-Scale Graph Processing," in SIGMOD'10, Jun. 8, 2010, pg. 135-145.
Hong et al., "Green-Marl: A DSL for Easy and Efficient Graph Analysis," in ASPLOS'12, Mar. 6, 2012, 14 pgs.

* cited by examiner

```
1. parallel Foreach(n: G.Nodes) // for each node n in graph G
2.   Foreach(t: n.Nbrs) // for each node t that is an (outgoing) neighbor of n
3.     t.foo += n.bar;  // sum up n's bar value into t's foo.
```

FIG. 4A

```
1. parallel Foreach(t: G.Nodes) // for each node t in graph G
2.   Foreach(n: t.InNbrs) // for each n, the incoming neighbor of t
3.     t.foo += n.bar;  // sum up n's bar value into t's foo.
```

FIG. 4B

```
1. Foreach(n: G.Nodes)      // for each node n in graph G
2.   Foreach(t: n.Nbrs)     // for every t that is the (outgoing) neighbor of n
3.     do_something(n,t);
4. Foreach(t: G.Nodes)      // for each node n in graph G
5.   Foreach(n: t.InNbrs)   // for each n that is the incoming neighbor of t
6.     do_other_thing(n,t);
7. Foreach(n: G.Nodes)      // for each node n in graph G
8.   Foreach(t: n.Nbrs)     // for each t that is the (outgoing) neighbor of n
9.     do_yet_another_thing(n,t);
```

FIG. 5A

```
1. Foreach(n: G.Nodes)      // for each node n in graph G
2.   Foreach(t: n.Nbrs)     // for each t that is the (outgoing) neighbor of n
3.     do_something(n,t);
4. Foreach(n: G.Nodes)      // for each node n in graph G
5.   Foreach(t: n.Nbrs)     // for each t that is the (outgoing) neighbor of n
6.     do_other_thing(n,t);
7. Foreach(n: G.Nodes)      // for each node n in graph G
8.   Foreach(t: n.Nbrs)     // for each t that is the (outgoing) neighbor of n
9.     do_yet_another_thing(n,t);
```

SYSTEM FOR APPLYING TRANSFORMATION TO IMPROVE GRAPH ANALYSIS

FIELD OF THE INVENTION

The present invention relates generally to graph analysis and more particularly to neighborhood iterating operations in directed graphs.

BACKGROUND

Graph analysis is an important emerging workload area. Such analysis is used to extract valuable information from large graph instances (representing people and their connections, but increasingly also places, actions, or events). The current technology includes a stack built on top of a relational database and is not well suited for graph analysis.

A typical graph is a set of nodes or vertices connected by edges each of which has a particular direction. A computer-represented graph is a data structure, such as an adjacency list or adjacency matrix, in which a representation of the graph is stored. In an adjacency list of a graph G=(V, E) with vertices V and edges E, the adjacency list is an array of lists, one list for each vertex. The list for each vertex contains the names of all of the vertices adjacent to that vertex. In an adjacency matrix of a graph G=(V, E), the elements are all possible pairs of vertices. If an edge exists between a pair of vertices, the element in the matrix is marked.

A graph analysis program often includes a series of neighborhood iterating operations. These operations iterate over vertices that are neighborhood vertices to other vertices in the directed graph while reading and writing data associated with the vertices and their neighborhood vertices.

In some cases, a neighborhood iterating operation can be transformed into a functionally equivalent operation by altering the direction of the edges in the graph. This transformation is sometimes called an edge-flipping transformation, but often such a transformation is not feasible because altering the graph either is not permitted or takes too much time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for transforming operations performed on data in a directed graph. In one embodiment, the technique includes: obtaining a computer-represented graph of nodes, where the nodes in the graph include a set S of nodes and a set T of nodes, and the nodes in the set S are connected to the nodes in the set T by directed edges; obtaining a graph analysis computer program relating to the computer-represented graph, where the graph analysis program operates on data associated with the nodes in the computer-represented graph; detecting in the graph analysis computer program a neighborhood iterating operation over the nodes in the computer-represented graph by scanning the graph analysis computer program, where the neighborhood iterating operation iterates over the nodes in the set S and the nodes in the set T that are neighbors of the nodes in the set S to compute a value of a function based on the data associated with the nodes of the set S and the set T; and applying a neighbor-flipping transformation to the neighborhood iterating operation, where the neighborhood iterating operation iterates over the nodes in the set T and the nodes in the set S that are neighbors of the nodes in the set T to compute the value of the function.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

One embodiment is to provide an automatic method for applying a neighbor-flipping transformation. The embodiment is a method that can apply automatic neighbor-flipping transformation thus sparing a user from having to manually recode the entire graph analysis program. This is possible because the transformation has access to high-level semantic information relating to the user-provided graph analysis program. Examples of such semantic information are the direction of neighborhood iteration, data fields of vertices that are being accessed and the kinds of operations that are applied on those data fields.

While being functionally equivalent, the transformed operation performs better than the original operation for at least the following reasons: (a) in parallel execution, such a transformation can avoid use of expensive atomic operations; and (b) cache memory can be utilized in a more efficient manner by such a transformation, because it can enforce the consecutive operations to use the same set of edges.

An embodiment improves the compatibility of graph analysis procedures for certain analysis frameworks. Some graph analysis programs are incompatible with certain graph analysis frameworks, but become compatible after the neighbor-flipping transformation is applied.

An embodiment greatly reduces user's overhead to achieve the above two benefits since it applies neighbor-flipping transformation without requiring a user to recode the graph analysis program. Therefore, an average user can easily apply the neighbor-flipping transformation.

Embodiments are applicable to any system that performs graph analysis. For instance, Graph database systems (e.g., neo4j) can apply an embodiment for the purpose of performance optimization. In addition, an embodiment can be adopted as a front-end system, which applies neighbor-flipping transformation to the given graph analysis procedure, in order to make it compatible to a specific graph-data processing framework.

DETAILED DISCUSSION

Figure 1:
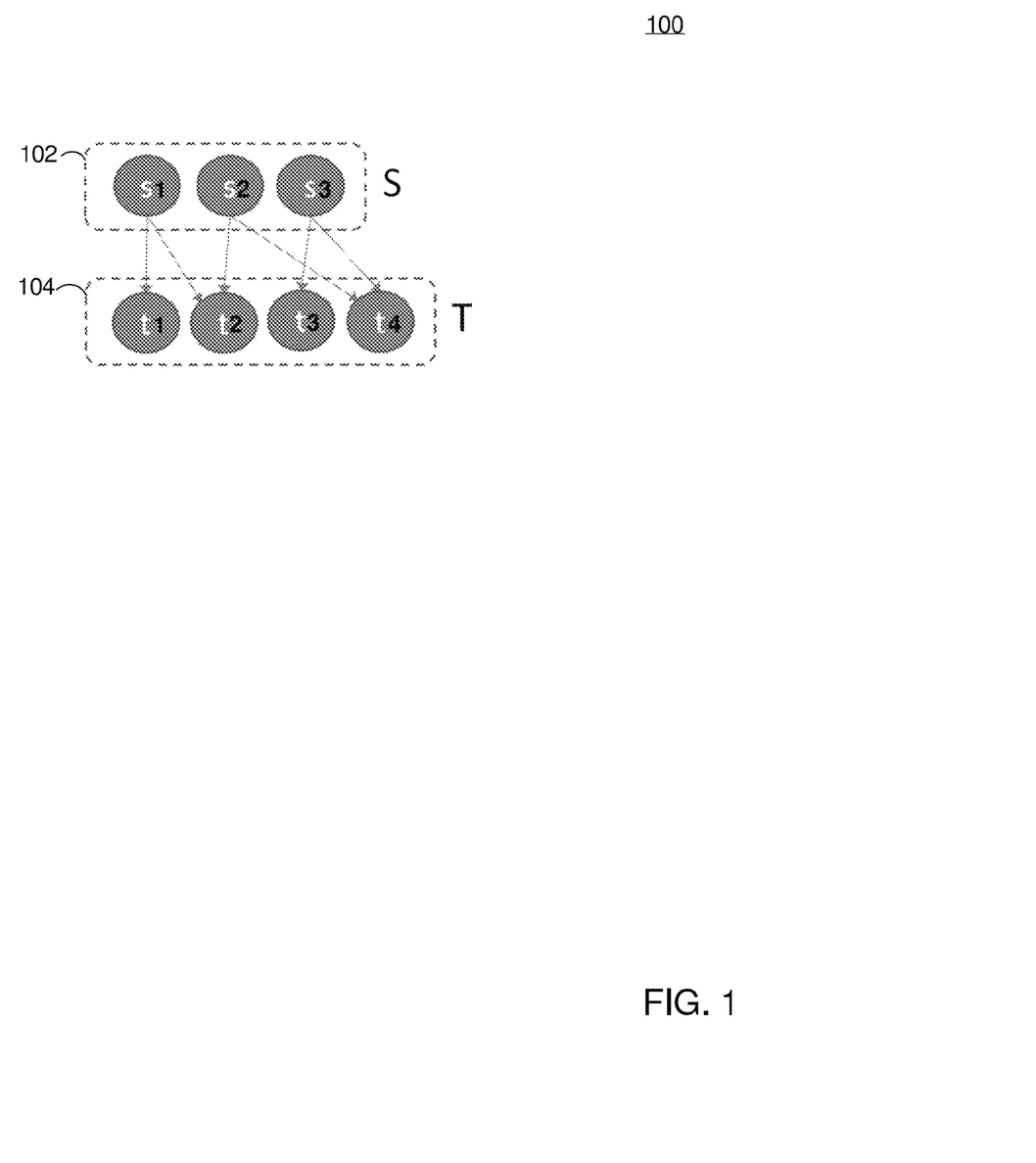
FIG. 1 depicts an arrangement of nodes in a directed graph.

FIG. 1 shows a portion of a directed graph that includes a first set S 102 of nodes s1, s2, and s3 and a second set T 104 of nodes t1, t2, t3 and t4. The second set T 104 of nodes is connected by directed edges to the first set S of nodes and some or all of the nodes in the second set S are neighbor nodes of those in the first set T of nodes. In one view, traversing through nodes in set S in the direction of the edges, node s1 has out-neighbors t1 and t2; node s2 has out-neighbors t2 and t4; and node s3 has out-neighbors t3 and t4. In another view of the graph, traversing through nodes in T opposite to the direction of the edges, node t1 has an in-neighbor of s1; node t2 has in-neighbors s1 and s2; node t3 has in-neighbors s3; and node t4 has in-neighbors s2 and s3.

Semantic Information

Figure 2:
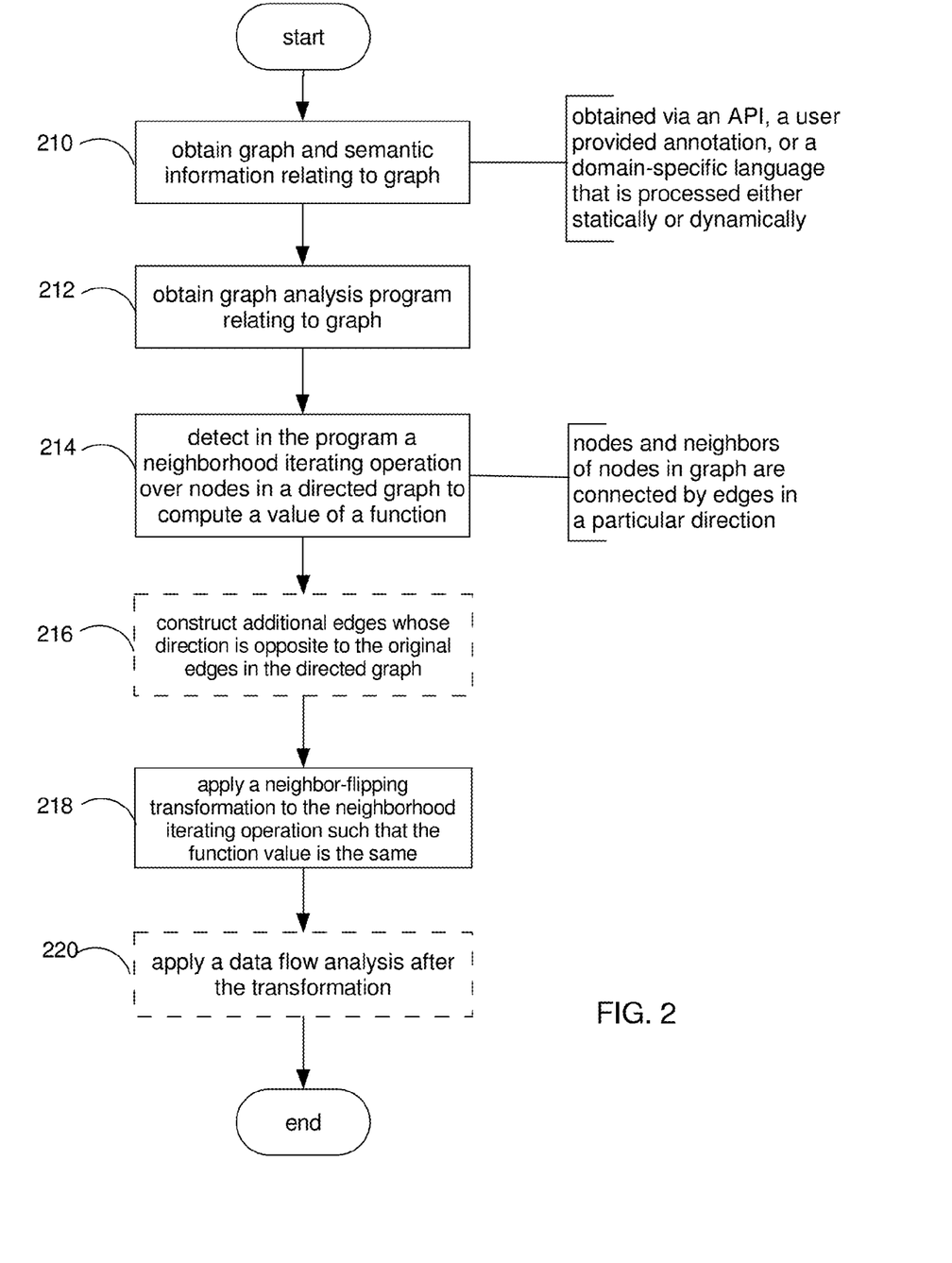
FIG. 2 depicts a flow chart of the overall process in an embodiment.

The system maintains high-level semantic information on the graph analysis program given by the user. Referring to FIG. 2, such high-level semantic information can be obtained, in step 210, through, for example (but not limited by), application programming interface (API), user-provided annotation, or domain-specific language that is processed either statically or dynamically. The high-level semantic information includes: (a) whether the operation is a neighborhood iterating one; (b) the particular edge direction used in the operation; (c) the data fields that are being accessed in the operation; and (d) the operations that are applied to those data fields in the operation.

Graph Analysis Program

In step 212, of FIG. 2, the system obtains a graph analysis program. Such a program computes functions whose inputs are data relating to the nodes in the graph. For example, for in a social network graph, the graph analysis program counts items in each node relating to a particular characteristic of the node.

Identification and Selection of Neighborhood Iterating Operations

Given a graph analysis program, an embodiment selects, in step 214 of FIG. 2, one or more neighborhood iterating operations in the program to which a transformation can be applied. The decision can be made automatically by the system (possibly in a heuristic way), or can be following the guidance of the user (e.g., by the means of annotation or command-line arguments). A selected neighborhood iterating operation includes a first set and a second set of nodes, the second set including nodes that are neighbors of nodes in the first set. If nodes in a third set are neighbors to nodes in the second set, then the transformation can be applied to the second and third set of nodes, indicating that the transformation is applied recursively throughout the graph.

Transformation

In one embodiment, a neighbor-flipping transformation is applied, in step 218, in following manner. A neighborhood iterating operation is identified from the given high-level semantic information. The system then applies neighbor-flipping transformation to the neighborhood operation.

The original operation iterates over every node (vertex) s in set S and every neighbor node t that is an out-neighbor of node s and a member of the set T. In symbols, (t∈OutNbr(s)) ∧ (t∈T), where OutNbr(s) gives the output neighbors of s and an output neighbor is a neighbor obtained by following a directed line from s to t.

During this iteration, the operation reads some data fields associated with nodes in S and T and applies functions, $f$ and g, to these data. In the figure, function $f$ operates on D2 of the nodes in S and D3 of the nodes in T and updates D1 of the nodes in S. Function g operates on D5 of the nodes S and D6 of the nodes in T and updates D4 of the nodes in T. Data fields associated with each vertex are not limited to primitive data types. They also can be collection types, such as sets, lists, and queues, on which the embodiment has high-level semantic information.

After applying the neighbor-flipping operation, the iteration occurs over every node t in the set T and every neighbor node s that is an in-neighbor of node t and a member of set S. In symbols, (s∈InNbr(t)) ∧ (s ∈S), where InNbr(t) gives the input neighbors of t and an input neighbor is a neighbor obtained by following a directed line from t to s.

After applying neighbor-flipping operation, the functions $f$ and g have the same value. The function $f$ operates on D2 of the nodes in S and D3 of the nodes in T and updates D1 in S. Function g operates on D5 of the nodes in S and D6 of the nodes in T and updates D4 of the nodes in T. The difference is that the roles of nodes s and t are switched. Prior to the transformation, information was obtained by traversing the graph in the same direction of its edges. After the transformation, information is obtained by traversing the graph in the opposite direction of its edges.

Optionally, in step 216, prior to applying the neighbor-flipping transformation, in some cases it may be desirable or necessary to construct edges whose direction is opposite to the original edges, while retaining the original edges and their direction, so that the graph can be traversed in either direction. In one embodiment, reverse-edge construction occurs when the first set of nodes and the second set of nodes reside on or are distributed over multiple computer systems.

Dataflow Analysis After Transformation

After performing a transformation, an embodiment performs, in step 220, a dataflow analysis to ensure that application of neighbor-flipping transformation does not in any way alter the functionality of the original operation. In the case when the graph analysis program can be configured for parallel execution, the embodiment exploits the fact that reductions or grow/shrink operations on unordered collections can be executed in any order (or even in parallel), which makes it easy to prove the two operations are equivalent.

The embodiment can be used as part of graph data processing system, which applies neighbor-flipping transformation to the user-given graph analysis program, before the system executes the program. Alternatively, it can be used as a stand-alone system, which takes a graph analysis program as an input but emits an equivalent graph analysis program where neighbor-flipping operations are applied; the output of such a system can be fed into a separate graph processing system.

Figure 3:
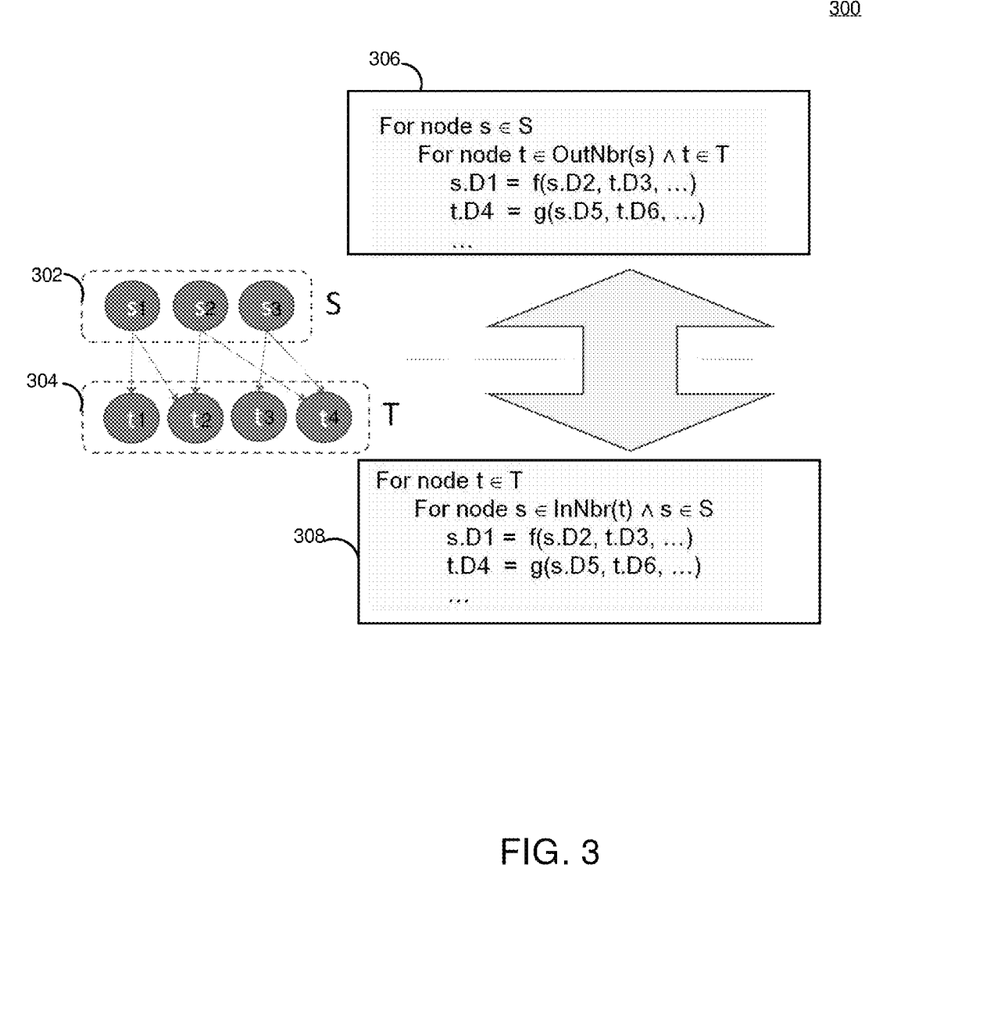
FIG. 3 depicts pseudo code for an example transformation.

FIG. 3 depicts an example graph and pseudo code of an example transformation. In FIG. 3, set S 302 has three nodes s1, s2 and s3 and set T 304 has four nodes t1, t2, t3, and t4. Node s1 connects to nodes t1 and t2; node s2 connects to nodes t2 and t4; and node s3 connects to nodes t3 and t4. The edges are directed from nodes in S to nodes in T.

Pseudo-code 306 provides an example of iteration code before the transformation. Pseudo-code 306 states: for each node selected in S and then for all of the output neighbors in T of the selected node in S, compute the value of the function f and the value of function g. Thus, pseudo-code 306 starts with the nodes in S and traverses the graph for data according to the direction of the edges.

Pseudo-code 308 provides an example of iteration code after the transformation. Pseudo-code 308 states: for each node selected in T and then for all of the input neighbors in S of the selected node in T, compute the value of the functions f and g. Thus, pseudo-code 308 starts with the nodes in T and traverses the graph for data in a direction opposite to the direction of the edges.

Atomic Operations

Figure 4A:
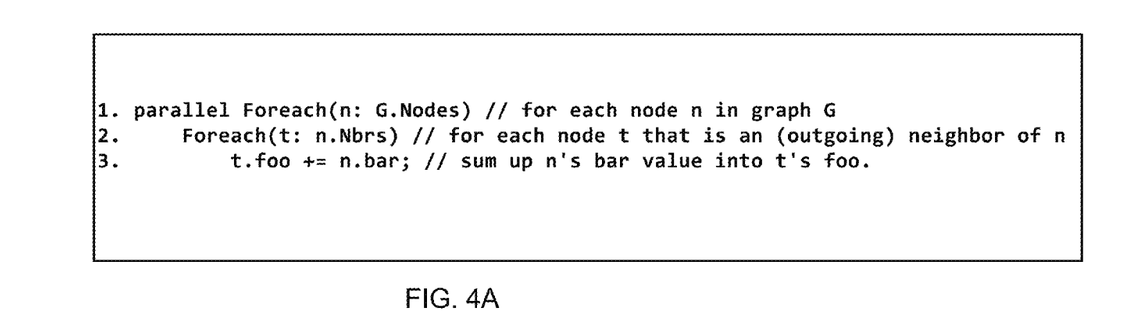
FIGS. 4A and 4B depict example code in a graph analysis program.

The neighbor-flipping operation improves performance in many cases by eliminating the need for atomic operations, when the outer iteration is run with multiple concurrent threads. FIG. 4A gives example code for such as case. In FIG. 4A, the Foreach iterator in line 1 for the nodes n is marked with the keyword "parallel," which tells the interpreter or compiler to execute the iterator in parallel, creating as many concurrent agents as there are nodes n. Each one of those agents is attempting to update in line 3 one or more out-neighbor nodes t. If any two of these agents attempt to update the same out-neighbor node t, then a write-write conflict exists. To resolve the conflict, a first one of the agents must obtain a lock, perform the update, and then release the lock, so that a second agent can perform its update. This slows down the updating of the node t.

Figure 4B:
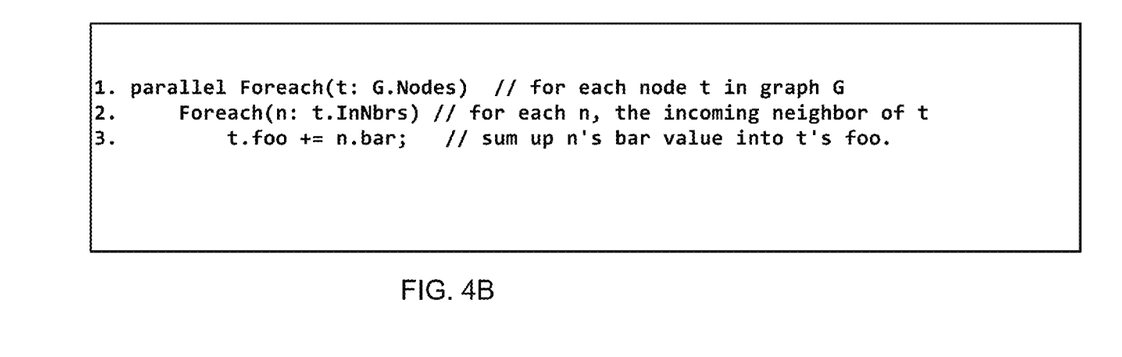

In FIG. 4B, the code has been modified by the neighbor-flipping transformation and now the iterator for the nodes t is run with multiple concurrent threads. Thus, there are as many concurrent agents as there are nodes t, which are the nodes being updated in line 3. This means each agent is reading from the nodes n, which are the in-neighbors of t, and updating the node t for which it is the agent. In this case, there are no write-write conflicts and no atomic operations are needed, thereby improving performance.

Cache Benefit

Figure 5A:
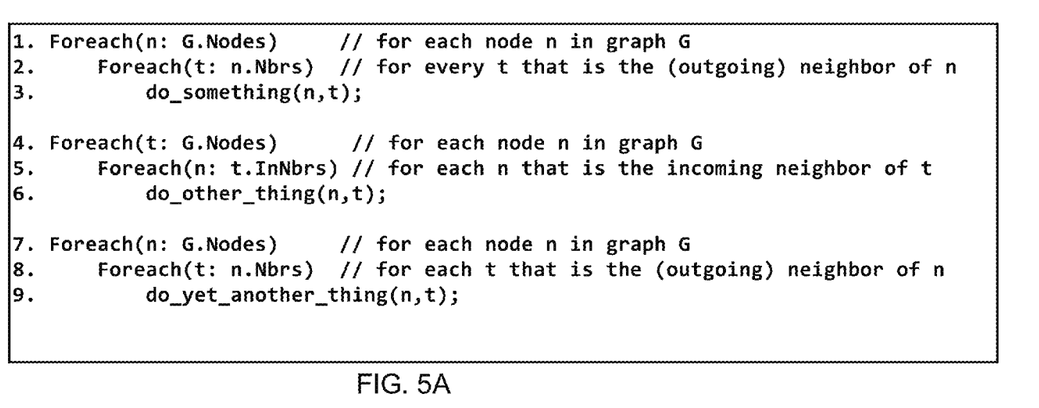
FIGS. 5A and 5B depict example code in another graph analysis program.

The neighbor-flipping operation improves cache performance in many cases by reducing the miss rate. FIG. 5A depicts a case in cache performance suffers from higher miss rates. In FIG. 5A, three neighbor-iterating operations, first, in lines 1-3 over n and t (in that order), then in lines 4-6 over t and n, and then in line 7-9 over n and t. Assume a processor executing this code is executing from a cache and that the nodes are brought into the cache during execution. Thus, after the first pair of iterators in lines 1-3, nodes n and their out-neighbors are in the cache. Next, the second pair of iterators execute in lines 4-6, traversing all of the nodes t and their in-neighbors n. However, the cache does not know that a particular node is an in-neighbor of another node, because the first pair of iterators did not access the nodes with an in-neighbor relationship. This causes cache misses when the in-neighbors are referenced. Finally, when the third set of iterators executes in lines 7-9, another set of cache misses occurs, because of alteration of the cache contents from the second pair of iterators.

Figure 5B:
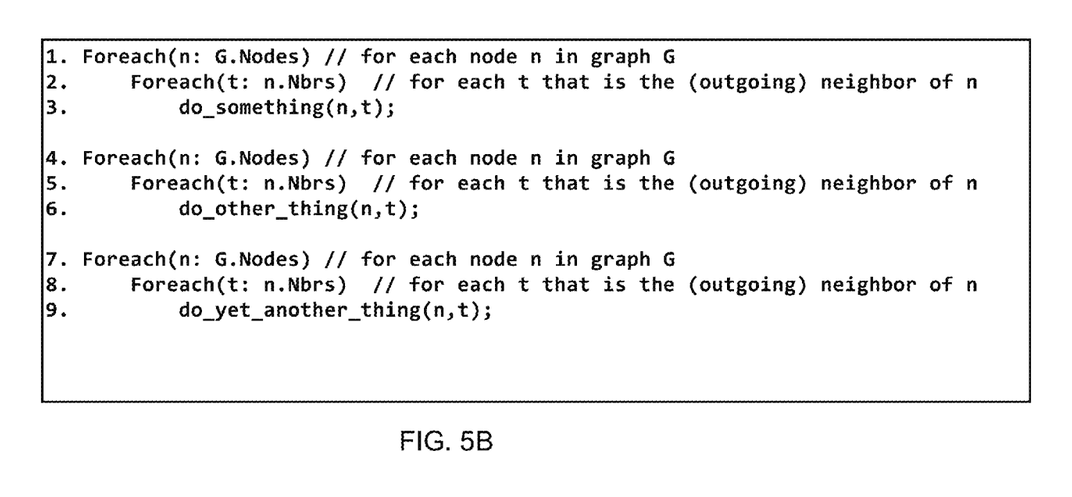

FIG. 5B depicts a case in which a neighbor-flipping transformation is applied to the second pair of iterators in lines 4-6, so that each pair of iterators has the same order over n and t. Because the neighbor relationship is the same in each pair of iterators, the cache misses are reduced.

Frameworks

As indicated above, application of the neighbor-flipping transformation to a graph analysis procedure makes the procedure compatible with specific graph processing frameworks. A graph processing framework is a hardware or software system that can execute multiple, different graph algorithms supplied by the user. For example, the Java Universal Network/Graph framework is a software library that provides an extendible language for performing graph modeling, analysis, and visualization of graph data. The language has the form of Java library calls, which perform pre-determined functions on a graph, such as adding and removing edges and vertices, getting collections of edges and vertices, and getting information concerning the endpoints of an edge in the graph. Some of these frameworks may not allow the use of incoming neighbors, even though certain algorithms are naturally described with incoming neighbors. The neighbor-flipping operation in the above embodiments can transform incoming neighbors into an equivalent program having only outgoing neighbors, thereby making it compatible with a framework.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
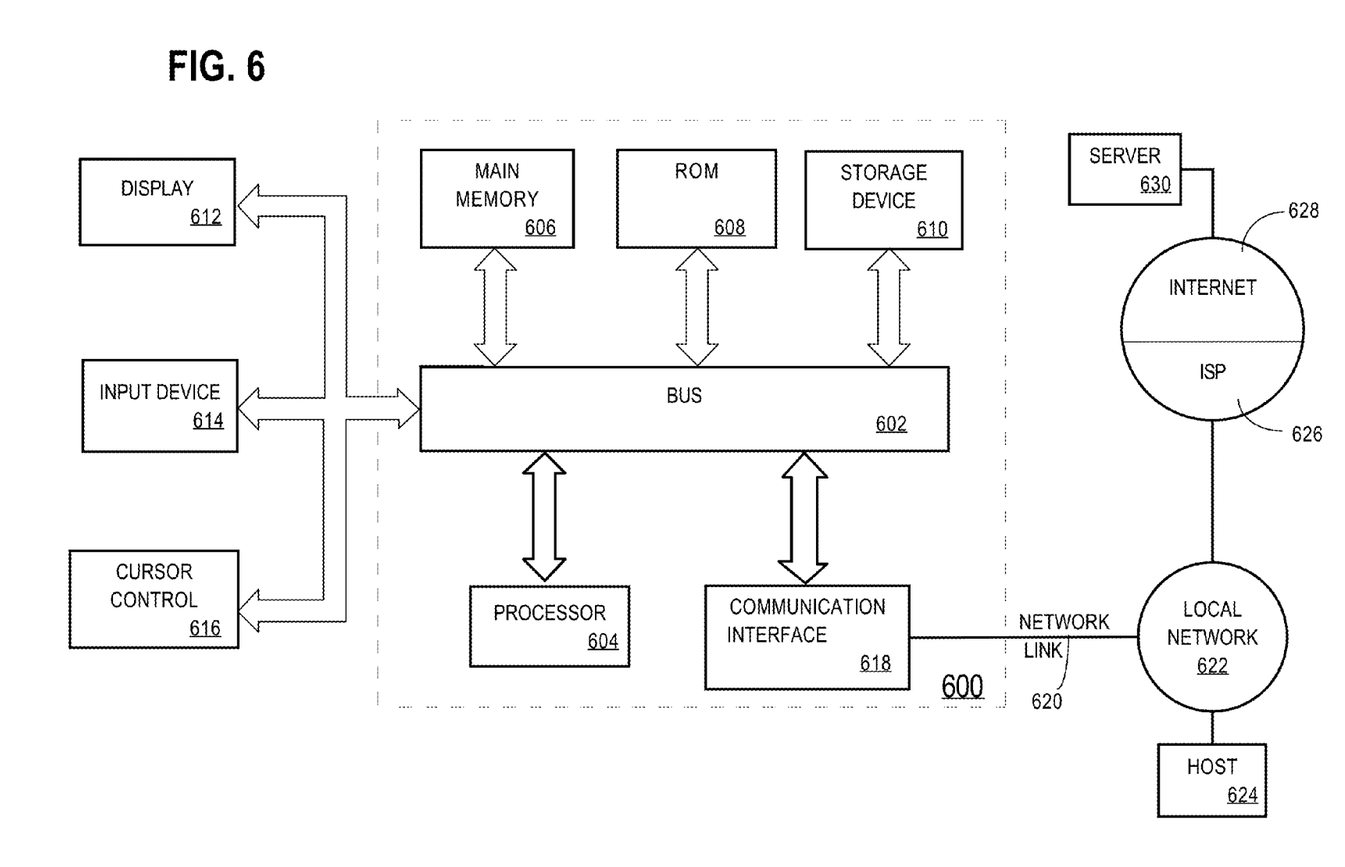
FIG. 6 depicts an example computer system in which an embodiment operates.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for automatically transforming operations performed on data in a directed graph, the method comprising:
    obtaining a computer-represented graph of nodes, wherein the nodes in the graph include a set S of nodes and a set T of nodes, and wherein the nodes in the set S are connected to the nodes in the set T by directed edges;
    obtaining a graph analysis computer program relating to the computer-represented graph, wherein the graph analysis program operates on data associated with the nodes in the computer-represented graph;
    detecting in the graph analysis computer program a neighborhood iterating operation over the nodes in the computer-represented graph by scanning the graph analysis computer program, wherein the neighborhood iterating operation iterates over the nodes in the set S and the nodes in the set T that are neighbors of the nodes in the set S to compute a value of a function based on data associated with the nodes of the set S and the set T;
    applying a neighbor-flipping transformation to the neighborhood iterating operation to generate a transformed neighborhood iterating operation, wherein the transformed neighborhood iterating operation iterates over the nodes in the set T and the nodes in the set S that are neighbors of the nodes in the set T to compute the value of the function; and
    wherein the method is performed by a computer system.

2. The computer-implemented method of claim 1,
    wherein the graph analysis computer program is written in a graph-oriented language that is compiled to generate executable code; and
    wherein the neighbor-flipping transformation occurs during the compilation of the graph-oriented language.

3. The computer-implemented method of claim 1, further comprising constructing, prior to applying the transformation, additional directed edges between the nodes in the set S and the nodes in the set T, the additional directed edges having a direction opposite to the directed edges connecting the nodes in the set S to the nodes in the set T.

4. The computer-implemented method of claim 1, wherein set the S and the set T reside on or are distributed over multiple computer systems.

5. The computer-implemented method of claim 4, further comprising constructing, prior to applying the transformation, additional directed edges between the nodes in the set S and the nodes in the set T, the additional directed edges having a direction opposite to the directed edges connecting the nodes in the set S to the nodes in the set T.

6. A non-transitory computer-readable medium carrying one or more sequences of instructions for automatically transforming operations performed on data in a directed graph, wherein execution of the one or more sequences of instructions by one or more processors causes:
   obtaining a computer-represented graph of nodes, wherein the nodes in the graph include a set S of nodes and a set T of nodes, and wherein the nodes in the set S are connected to the nodes in the set T by directed edges;
   obtaining a graph analysis computer program relating to the computer-represented graph, wherein the graph analysis program operates on data associated with the nodes in the computer-represented graph;
   detecting in the graph analysis computer program a neighborhood iterating operation over the nodes in the computer-represented graph by scanning the graph analysis computer program, wherein the neighborhood iterating operation iterates over the nodes in the set S and the nodes in the set T that are neighbors of the nodes in the set S to compute a value of a function based on data associated with the nodes of the set S and the set T; and
   applying a neighbor-flipping transformation to the neighborhood iterating operation to generate a transformed neighborhood iterating operation, wherein the transformed neighborhood iterating operation iterates over the nodes in the set T and the nodes in the set S that are neighbors of the nodes in the set T to compute the value of the function.

7. The non-transitory computer readable medium of claim 6,
   wherein the graph analysis computer program is written in a graph-oriented language that is compiled to generate executable code; and
   wherein the neighbor-flipping transformation occurs during the compilation of the graph-oriented language.

8. The non-transitory computer readable medium of claim 6, further comprising a sequence of instructions which, when executed by one or more processors, causes constructing, prior to applying the transformation, additional directed edges between the nodes in the set S and the nodes in the set T, the additional directed edges having a direction opposite to the directed edges connecting the nodes in the set S to the nodes in the set T.

9. The non-transitory computer readable medium of claim 6, wherein the set S and the set T reside on or are distributed over multiple computer systems.

10. The non-transitory computer readable medium of claim 9, further comprising a sequence of instructions, which when executed by one or more processors, causes constructing, prior to applying the transformation, additional directed edges between the nodes in the set S and the nodes in the set T, the additional directed edges having a direction opposite to the directed edges connecting the nodes in the set S to the nodes in the set T.

11. A computer system for automatically transforming operations performed on data in a directed graph, the system comprising:
   a processing unit; and
   a memory subsystem coupled to the processing unit, wherein each memory subsystem includes one or more sequences of instructions that configure the processing unit to:
      obtain a computer-represented graph of nodes, wherein the nodes in the graph include a set S of nodes and a set T of nodes, and wherein the nodes in the set S are connected to the nodes in the set T by directed edges;
      obtain a graph analysis computer program relating to the computer-represented graph, wherein the graph analysis program operates on data associated with the nodes in the computer-represented graph;
      detect in the graph analysis computer program a neighborhood iterating operation over the nodes in the computer-represented graph by scanning the graph analysis computer program, wherein the neighborhood iterating operation iterates over the nodes in the set S and the nodes in the set T that are neighbors of the nodes in the set S to compute a value of a function based on data associated with the nodes of the set S and the set T; and
      apply a neighbor-flipping transformation to the neighborhood iterating operation to generate a transformed neighborhood iterating operation, wherein the transformed neighborhood iterating operation iterates over the nodes in the set T and the nodes in the set S that are neighbors of the nodes in the set T to compute the value of the function.

12. The computer system of claim 11,
   wherein the graph analysis computer program is written in a graph-oriented language that is compiled to generate executable code; and
   wherein the neighbor-flipping transformation occurs during the compilation of the graph-oriented language.

13. The computer system of claim 11, further comprising a sequence of instructions that configure the processing unit to construct, prior to applying the transformation, additional directed edges between the nodes in the set S and the nodes in the set T, the additional directed edges having a direction opposite to the directed edges connecting the nodes in set S to the nodes in set T.

14. The computer system of claim 11, wherein the set S and the set T reside on or are distributed over multiple computer systems.

15. The computer system of claim 14, further comprising a sequence of instructions that configure the processor to construct, prior to applying the transformation, additional directed edges between the nodes in the set S and the nodes in the set T, the additional directed edges having a direction opposite to the directed edges connecting the nodes in the set S to the nodes in the set T.

* * * * *